Feb. 15, 1949.  C. D. MAGNESEN  2,461,907
BEARING SEAL

Filed March 16, 1948  2 Sheets-Sheet 1

INVENTOR.
CHARLES D. MAGNESEN
BY
ATTORNEY.

Feb. 15, 1949.                C. D. MAGNESEN                2,461,907
                                 BEARING SEAL
Filed March 16, 1948                                     2 Sheets-Sheet 2

INVENTOR.
CHARLES D. MAGNESEN
BY Harry H. Hitzeman
ATTORNEY.

Patented Feb. 15, 1949

2,461,907

UNITED STATES PATENT OFFICE 2,461,907

BEARING SEAL

Charles D. Magnesen, Chicago, Ill., assignor to Modern Design Products Company, Chicago, Ill., a corporation of Illinois Application March 16, 1948, Serial No. 15,240

2 Claims. (Cl. 286—11)

My invention relates to bearing seals and similar devices.

My invention relates more particularly to sealing devices or sealing means adapted to form a fluid seal between two relatively rotating parts.

Bearing seals of the type which I am about to describe are particularly useful in automotive fluid circulating pumps, refrigerator driving units and a large variety of other mechanisms wherein the housing, through which a shaft is directed, may contain a fluid which must of necessity be prevented from escaping about the rotating shaft which extends through the housing. While a large number of various constructions of bearing seals have been proposed, for the purposes described such constructions have not generally been entirely satisfactory. In some of the most popular types of bearing seals the bearing nose or seal member is usually carried by a housing that is connected directly to a rotating shaft by means of a diaphragm, bellows or other flexible connector which is securely fastened to the shaft and to the bearing nose housing, so that the force of rotating the seal against the bearing surface must of necessity be conveyed through the flexible member of the ensemble. This, together with the other strains on this member, naturally tends to weaken this particular element of the assembly and greatly reduce the life of a bearing seal constructed in this general manner.

The principal object of the present invention is to provide an improved bearing seal of a type wherein the flexible member, which thrusts the bearing nose against a bearing surface under resilient pressure, is not subjected to the strain of being the vehicle through which the entire bearing seal ensemble is rotated.

A further object of the present invention is to provide an improved structure of the type described wherein the flexible member of the ensemble is used only to permit the necessary movement longitudinally of the shaft so that sufficient force may be exerted on the bearing nose to make an effective seal against a bearing surface.

A further object of the invention is to provide an improved bearing seal of the type described wherein the bearing nose, which is the only wearing part, is made removable so that when the same wears out it may be removed and a new bearing nose substituted.

A further object of the invention is to provide a bearing seal assembly of the type described that is extremely simple in construction yet capable of long and hard usage without becoming broken or out of order.

A further object of the present invention is to provide a construction wherein the drive between the rotating shaft and the bearing seal mounted on the same for rotation therewith is a positive mechanical connection, so arranged, however, that the bearing nose is capable of longitudinal movement about the shaft and is provided with means for effecting a continuous yieldable pressure of the same against a bearing surface.

Other objects and advantages will be more apparent from the following description wherein reference is had to the accompanying two sheets of drawings, upon which:

Figure 1:
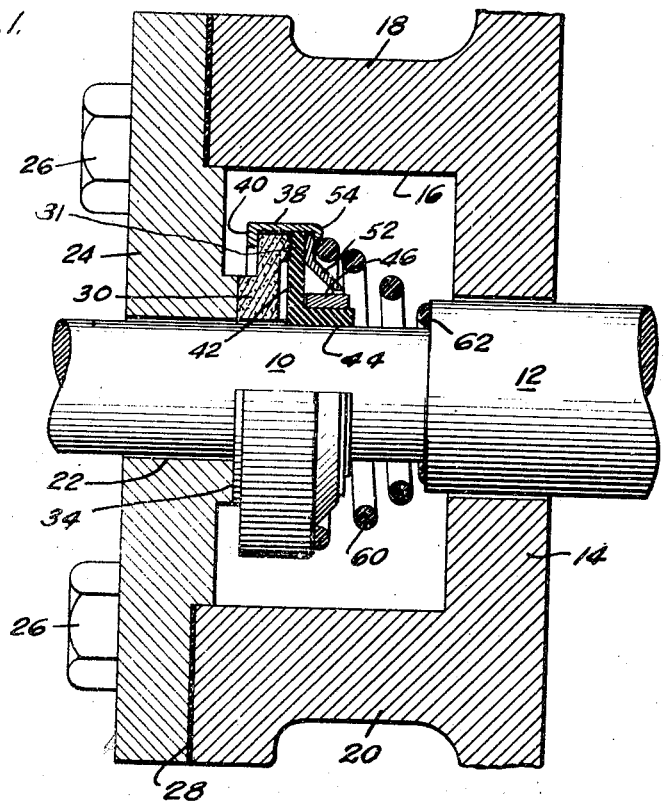
Fig. 1 is a vertical sectional view showing a rotating shaft extending from a housing and provided with my improved bearing seal, the seal being broken into half-section to more clearly show the parts.
Figure 2:
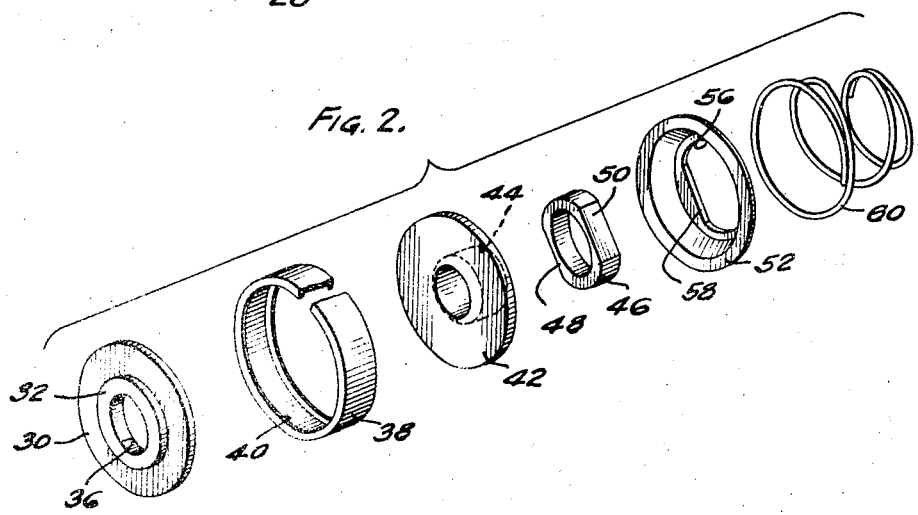
Fig. 2 is an exploded perspective view of my improved bearing seal illustrating the six parts which are assembled together in a front perspective position.

In the embodiment of the invention which I have chosen to illustrate, I have shown a rotatable shaft 10 which has an enlarged portion 12 that extends through the vertical wall 14 of a housing within which fluid under pressure may be present. The shaft 10 may extend through an enlarged opening 16 in lateral walls 18 and 20 of the housing 14 and through an opening 22 in a cover plate 24 positioned over the opening 16 and provided with bolt members 26 for connecting the same in sealed relation over the opening 16. The usual gasket 28 may be provided between the opposed faces of the cover plate and the wall of the opening.

The bearing nose 30, which may be constructed of graphite, hardened metal or any other suitable or desirable composition, depending upon the purpose for which the same is provided, may have an annular shoulder 32 which is adapted to bear against a bearing surface 34 on the cover plate 24. The opening 36 through the bearing nose is sufficiently large so that the shaft 10 extends therethrough with clearance. The bearing nose may be supported in a sheet metal housing member 38 formed with the inwardly turned flange portion 40 to provide a forward retaining wall for the bearing nose.

I provide a resilient disc-like member 42 constructed of neoprene, leather, flexible metal or any other suitable material having its periphery positioned within the housing 38 and provided with a sleeve portion 44 adapted to be frictionally and in a driving relation positioned upon the shaft 10. In order to clamp the same upon the shaft 10 I also provide a band member 46 which is provided with a pair of flattened sides 48 and 50. I employ a follower washer 52, which has its peripheral edge positioned within the housing 38. The edge of the housing 38 may be turned inwardly as shown at 54 to assemble together the bearing nose, the resilient member 42 and the follower 52. The follower 52 is provided with an opening 56 having flattened side walls 58 of a size sufficiently large to telescope over the fastener member 46. A coiled spring member 60 completes the ensemble and may be positioned between a shoulder 62 on the portion 12 of the shaft 10 and the follower member 52. In order to securely fasten the disc-like member 42 to the bearing nose 30 and to permit limited forward flexing movement of the member 42, I provide a plurality of circular serrations 31 adjacent the outer edge of the nose where the same is fastened against the member 42.

When the above mentioned assembly is mounted upon the shaft in the position shown in Fig. 1, the spring 60 will cause the bearing nose 30 to frictionally engage against the bearing surface 34 of the cover plate 24 due to the pressure of spring 60 positioned against the shoulder 62 upon the shaft. The flexible member 42 may yieldingly permit forward movement of the bearing nose 30 as the same wears due to the constant pressure of spring 60. The entire assembly, however, is caused to rotate with the shaft 10 by reason of the flattened sides 48 and 50 of the collar 46 being positioned through the opening 56 of the follower 52 so that at all times a constant mechanical connection is provided between the shaft 10 and the entire bearing assembly. In this manner, the only wear upon the flexible member 42 will be the flexing of the same to permit longitudinal movement of the bearing nose 30 along the shaft 10, thus insuring a much longer life for the entire assembly.

Figure 3:
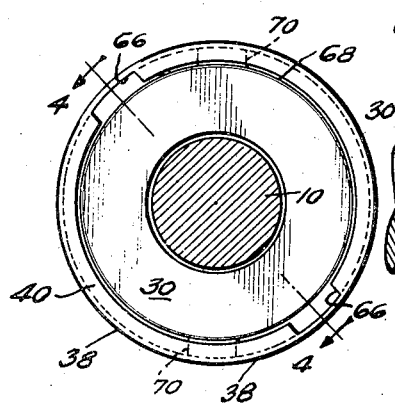
Fig. 3 is a front view of a modified form of my improved bearing seal mounted upon a rotating shaft and showing a modified construction thereof in which the bearing nose is removable.

As the bearing nose is the only portion of my improved sealing member that can wear out in normal use, I have shown several modifications of the same in which the nose portion is removable. Thus, for example, in Fig. 3 I have shown a pair of slots 66 in the forward wall 40 of the housing 38, I have shown the bearing nose having an outer peripheral edge 68 and a pair of lugs 70 extending outwardly to engage the inner surface of the housing 38. Thus, the bearing nose may be inserted with the lugs 70 through the slots 66 and slightly rotated to prevent the same from falling apart during storage or in transit. In use it is immaterial whether the bearing nose has a portion confined in the housing 38 or not.

Figure 4:
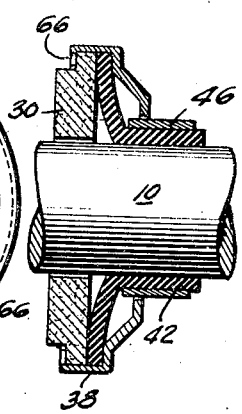
Fig. 4 is a vertical sectional view of the same taken generally on the lines 4—4 of Fig. 3.

In the modification shown in Fig. 4 I have also shown the seal member 38 and the follower as an integral unit forming the member 38 as shown at 38 to telescope over the collar 46.

Figure 5:
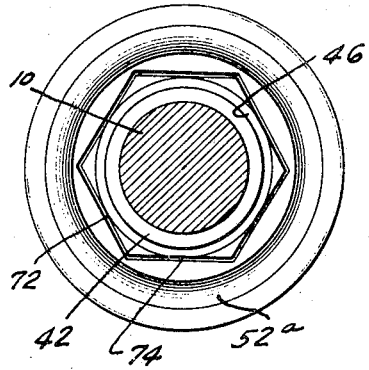
Fig. 5 is a back view of the same showing the manner in which the positive drive for the bearing nose is obtained.

In Fig. 5 I have also shown the collar 46 provided with the hexagonal peripheral walls 72 and a complementary slightly larger opening 74 in the wall 38 through which the same is telescoped.

Figure 6:
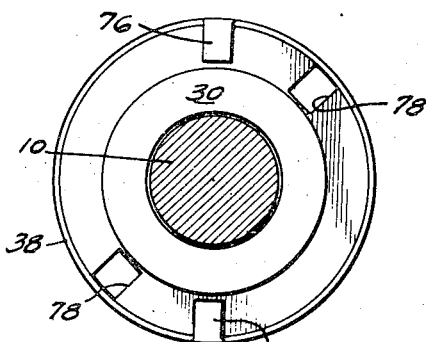
Fig. 6 is a front elevational view of a modified form of my improved bearing seal mounted upon a rotating shaft showing a different construction of removable bearing nose.

In Fig. 6 I have shown a still further modified form of bearing nose 30 and housing 38 in which the housing wall is provided with a pair of inwardly extending lugs 76. The bearing nose is provided with a pair of complementary slots 78 and may be inserted into the assembly by pushing the slots over the lugs and then rotating the nose slightly so that it will be held in position by the lugs.

Figure 7:
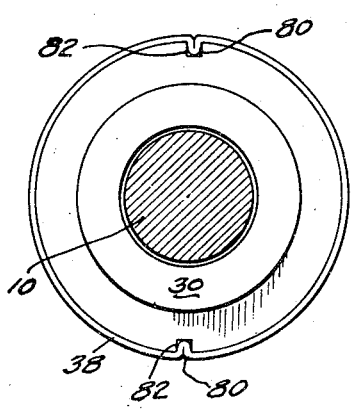
Fig. 7 is a similar front elevational view of my improved bearing seal showing a still further modified form of removable bearing nose.

In Fig. 7 I have shown a still further modified form of housing and a bearing nose assembly in which the housing 38 is provided with a pair of indented ridges 80 and the bearing nose with a pair of grooves 82 to fit over the same; thus, while the bearing nose is not held against removal from the housing, it is still assembled together with the same in a driving relation and when the housing 38 is rotated the bearing nose rotates therewith.

Figure 8:
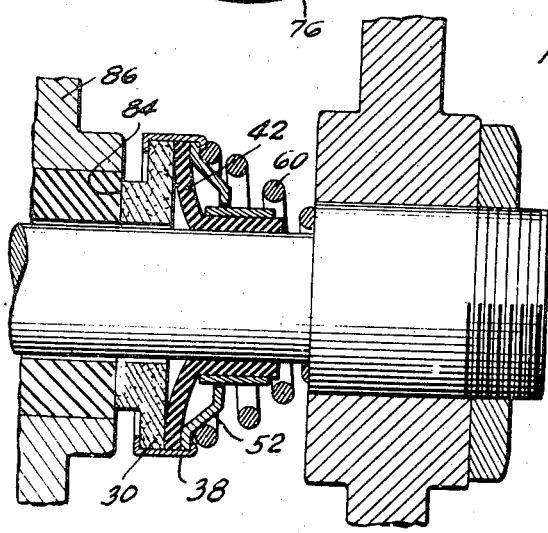
Fig. 8 is a vertical sectional view of a modified form of construction in which the bearing nose is shown located against the wall of a housing from which the shaft emanates.

In Fig. 8 I have shown a form of construction in which the bearing nose 30 may be mounted directly against the bearing surface 84 of the housing 86 within which the fluid may be contained. While the construction of the bearing seal assembly shown herein may be similar to that previously described, I have illustrated the manner in which the seal may be reversed upon the shaft from that shown in Fig. 1, and provide an effective seal directly against the wall of a housing of a fluid chamber.

While I have illustrated and described a specific embodiment of the invention and several modifications thereof, it will be apparent that the generic features which I desire to protect are the combination with a longitudinally alignable bearing nose of a positive or mechanical drive therefor from the shaft to which it is fastened, thus relieving the greater part of the strain upon the flexible or resilient disc, and permitting in this manner the use of a cheaper construction. I contemplate that changes and modifications may be made in the exact details shown, and what I desire to secure and protect by Letters Patent of the United States is:

1. A seal assembly for preventing flow of fluid along the surface of a cylindrical shaft, comprising a cylindrically shaped housing adapted to loosely encircle said shaft, a ring-shaped bearing means fixedly secured in said housing at one end thereof and having a forwardly projecting annular portion extending therefrom and adapted to bear axially against an annular surface, a resilient disk-like member mounted in said housing behind said bearing member and having a rearwardly extending sleeve portion adapted to embrace the shaft, a collar surrounding said sleeve portion and clamping the same to said shaft, said collar having a polygonal periphery, an end washer having a central opening formed to telescopically fit over said collar in axially slidable driving connection therewith, said washer bearing against the outer margin of said disk-like member and having its outer periphery secured in said housing.

2. A sealing unit to prevent the escape of fluid along a rotating shaft comprising an inherently resilient member having a sleeve portion non-rotatably mounted on the shaft and a laterally flexible flange-like portion extending radially therefrom, a collar arranged to clamp said sleeve portion to said shaft, an end member slidably telescoped over said collar and arranged in driving relation therewith, said end member engaging the margin of the flange-like portion of said resilient member, a disk-like bearing element telescoped over said shaft forwardly of said resilient member and having a forwardly projecting annular nose portion, said bearing element having one or more peripherally extending lugs, a cylindrical housing surrounding the outer edges of said bearing element, resilient member and end member, said housing having its end margins turned inwardly to clamp said members together in a tight unitary structure, the forward end margin having one or more radial slots therein corresponding in number and circumferential position to said lugs whereby said bearing element may be removed and replaced when worn.

CHARLES D. MAGNESEN.

REFERENCES CITED

The following references are of record in the file of this patent:

UNITED STATES PATENTS

| Number | Name | Date |
|---|---|---|
| 1,950,852 | Kuehn et al. | Mar. 13, 1934 |
| 2,272,526 | Keeran | Feb. 10, 1942 |
| 2,360,372 | Snyder | Oct. 17, 1944 |